Feb. 8, 1949.      J. W. LA FOLLETTE      2,460,832
APPARATUS FOR RESOLING RUBBER BOOTS AND THE LIKE
Filed April 21, 1944                    2 Sheets-Sheet 1

John W. LaFollette
INVENTOR.

BY
ATTORNEY.

Feb. 8, 1949.   J. W. LA FOLLETTE   2,460,832
APPARATUS FOR RESOLING RUBBER BOOTS AND THE LIKE
Filed April 21, 1944   2 Sheets-Sheet 2

John W. LaFollette
INVENTOR.

BY *H. A. McGrew*
ATTORNEY.

Patented Feb. 8, 1949

2,460,832

UNITED STATES PATENT OFFICE 2,460,832

APPARATUS FOR RESOLING RUBBER BOOTS AND THE LIKE

John W. La Follette, Denver, Colo.

Application April 21, 1944, Serial No. 532,097

5 Claims. (Cl. 18—34)

This invention relates to the art of resoling rubber boots and the like, and more particularly relates to a novel apparatus for shaping the tread surfaces of boots in a resoling operation.

In the past, rubber boots, particularly those worn by miners and for other industrial purposes, have been discarded to a large extent as soon as the tread surfaces have worn thin or have begun to leak. Lately, under the war emergency conditions, a necessity for conservation of rubber stocks has required that such boots be kept in service by resoling for as long a period as possible.

This has required that retreading operations be performed comparable to those employed in recapping or retreading automobile tires, which include as a part of the operation a vulcanizing action.

Various devices have been developed for use in performing such operations. Most of these have been subject to the disadvantage that they require a separate mold for each size of boot on which a new tread is to be applied. Others, while accommodating a variety of sizes in a single mold, have required a two or three stage vulcanizing operation to attain the desired cure of the tread surface.

It is an object of the present invention to provide a simple, efficient and economical apparatus for retreading rubber boots and the like.

Another object of the invention is to provide a simple, durable and efficient device for forming the tread surface of rubber boots in resoling operations.

A further object of the invention is to provide a tread-forming mold that can accommodate a wide variety of boot sizes.

Other objects reside in novel details of construction and novel combinations and arrangements of parts, all of which will be described in the course of the following description.

To afford a better understanding of the invention, reference will be made to the accompanying drawings, illustrating typical embodiments of the invention. In the drawings in the several views of which like parts have been designated similarly, Fig. 1 is a top plan of a mold member embodying features of the present invention;

Figure 1:
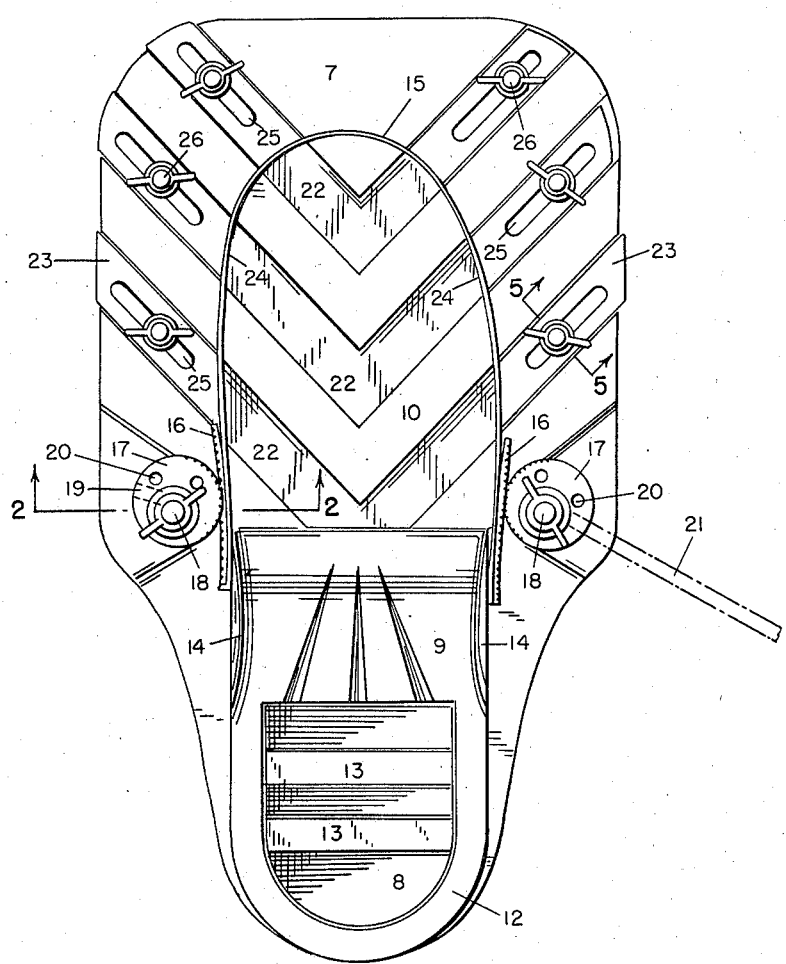
Figure 2:
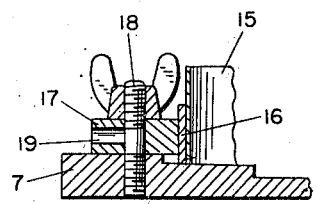
Fig. 2 is a section taken along the line 2—2, Fig. 1.

As clearly shown in Fig. 1, the mold member comprises a heat-conductive plate 7 having a heel-forming surface 8, an instep-forming portion 9, and a sole-forming surface 10. The heel-forming surface is enclosed by a shoulder or rim 12 and a plurality of ribs 13 extend across the enclosure to divide it into a series of recesses which define the pattern of the heel of a boot treated in the enclosure.

The shoulder 12 extends into two upstanding rims 14 at each side of the instep portion of plate 7 and the ends of said rims nearest the sole-forming surface provide abutments against which the ends of a flexible sole-enclosing member 15 bear. This member preferably is formed from a strip of resilient metal, such as sheet steel, and has its ends stiffened by serrated strips 16.

A pair of rotary cams 17 are mounted on plate 7 with their peripheries in spaced proximity to the ends of rims 14. The cams 17 are mounted on pivot pins 18 in off-center relationship and thereby have an eccentric relationship to the serrated strips 16 mounted on member 15, imparting lateral thrust to hold the flexible band 15 against the side of a boot in the mold. Preferably, the periphery of each cam is knurled to provide a friction surface for movable member 15 through contact with the serrated strip 16.

Suitable means for manual actuation of cams 17 are provided by side openings 19 or top openings 20. When the side openings 19 are utilized, a rod indicated by the dot and dash line representation 21 is inserted in said opening and the cam is then turned to draw the member 15 along the rims 14. At the same time the eccentric action exerts a lateral force against the member 15 in addition to the lengthwise pull.

Similarly, a tool having two studs or projections extending from a flat surface, register with the openings 20, and permit turning movement of cams 17, which thereby function in the manner hereinbefore described.

In order to provide a tread surface on the sole portion of a boot treated in the mold, the surface 10 is recessed, as indicated at 22. Plate members 23 are fitted for sliding movement in recesses 22 and may have upstanding ends or flanges 24 which bear against the member 15. Plates 23 are slotted as indicated at 25 to receive wing nuts 26.

This arrangement permits the plates 23 to be moved to selective positions in the recesses 22 and when properly located to be locked in such position. The cumulative effect of the several flanges 24 bearing against flexible member 15 is to bend such member into any desired sole-embracing position. In this arrangement, as well as when no flanges are provided on the plates 23, the ends of said members fill the recesses 22 to prevent rubber flowing out through same during the curing action.

Having thus described the arrangement of the component parts of the mold, the operation will be described now. A boot of any given size requiring resoling has a coating of camel-back applied along its under surface. The boot is next fitted into the mold, with the fitting operation progressing from the heel forwardly.

For this purpose, the member 15 may be loosened and extended lengthwise of the plate 7 a distance sufficient to permit easy insertion of the boot. A pressure-applying member 27 in the form of a shoemaker's last is inserted into the boot to clamp same against plate 7.

Figure 3:
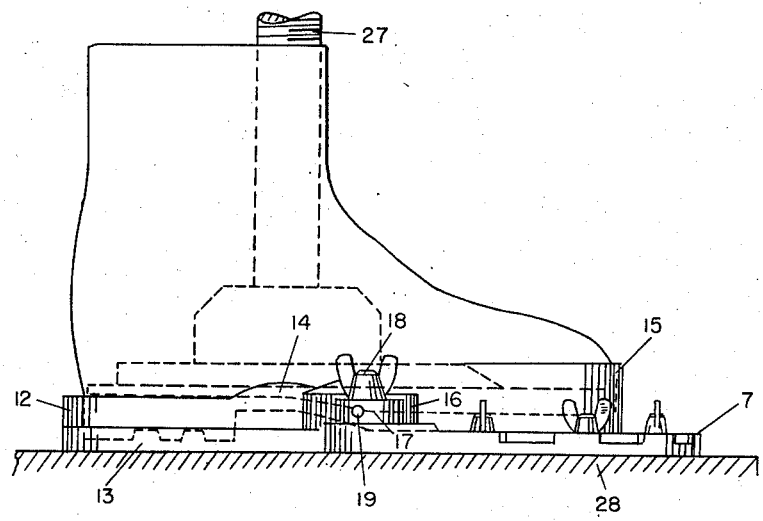
Fig. 3 is a side elevation of the mold member illustrated in Fig. 1 and drawn to a reduced scale.
Figure 4:
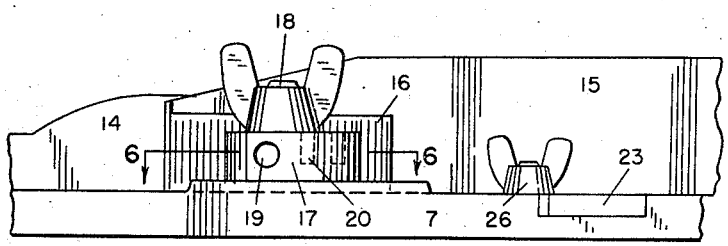
Fig. 4 is an enlarged, fragmentary side elevation of the cam assembly illustrated in Fig. 3.
Figures 5, 6:
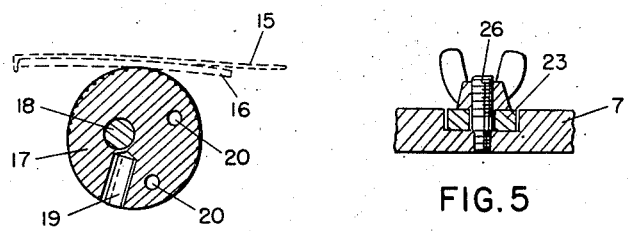
Fig. 5 is a section taken along the line 5—5, Fig. 1.
Fig. 6 is a section taken along the line 6—6, Fig. 4.

The band 15 is then drawn rearwardly and snugly around the sole portion of the boot, by actuation of cams 17 and plates 23, which are then locked in the desired position. The plate 7 then is heated by suitable means, such as the heating plate 28 (Fig. 3), to provide the necessary curing. The pressure exerted by last 27 and band 15 coupled with the contour of plate 7 serve to form an effective sole on the boot in the resoling operation.

When the desired cure has been attained, plate 7 is removed from heating plate 28, the boot is removed, and the mold then is ready for a repeat operation. If the boot taken for treatment in the succeeding operation is a different size than the one previously treated, the cams 17 are loosened and the plates as well, to permit extension of the flexible member 15 away from the stationary rims 14.

A boot is then inserted in the manner hereinbefore described and the plates 23 and cam members 17 are adjusted to provide the necessary drawing action in the rim-outlining procedure. It will be understood that the lateral shifting of the member 15 permits a single mold to be used in either right or left foot boots. However, when extensive operations are to be performed, it usually will be preferable to have one mold arranged as a righthand unit and a second mold arranged as a lefthand unit as less adjusting is necessary under such circumstances.

While the unit illustrated in Fig. 1 shows a preferred design of tread-forming surfaces, it will be understood that the arrangement of shoulders 13 and recesses 22 can be varied at will to provide any preferred tread design.

Likewise, while camelback has been described as a preferred composition for application to the boot in advance of the curing operation, it has been so designated simply because it is the most readily available material at the present time. Numerous synthetic compositions are suited for this purpose as well as other types of raw and reclaimed rubber compositions, and the present invention contemplates the use of all such materials or combinations thereof in the coating operation.

Inasmuch as heels and insteps do not vary much in size or shape throughout quite a wide range of boot sizes, I have found in practice that it is unnecessary to employ size variations in the shaping operation of the resoling treatment, so long as the sole portion can be extensively varied in size and shape to accommodate the variety of sizes in boots taken for treatment.

Consequently, the cam drawing action affords a simple and rapid means of adjusting for different sizes and applying side pressure, and where size variations between successive boots are slight, it usually is unnecessary to adjust the positions of the plate members 23 in view of the substantial variation provided by the cam action alone.

In this connection, it will be observed that where the strips 16 adjoin the rims 14, the rims are shaped to provide an outwardly diverging contour to matter in the mold, and the close fit of the flexible strip 15 provides an edge on the resoled boot which requires little, if any, trimming or buffing after removal from the mold.

For most operations, it will be unnecessary to have flanges on the plate 23 in gripping relation to the flexible band 15. The band is sufficiently flexible to be readily shaped about the various sized boots requiring resoling, and adjustment of the plate members 23 will be necessary under such conditions only when the ends of such members are spaced from band 15 in such a way that rubber will flow out from said spaces in the curing operation.

Consequently, the elimination of the band-gripping relationship permits a more rapid installation and removal of boots than can be attained when the members 23 bear against the band. Where time is an important factor in the operation, the entire side shaping action should be controlled by the cam action alone, after the initial manual fitting.

Changes and modifications may be availed of within the spirit and scope of the invention as defined in the hereunto appended claims.

What I claim and desire to secure by Letters Patent is:

1. A device of the character described, comprising a heat conductive plate adapted to support a rubber boot in a vulcanizing treatment and having heel, instep and sole tread forming surfaces, inclusive of tread defining recesses; tread outlining means on said plate, including a sole embracing member movably mounted on said plate with its ends extending rearwardly at the instep position, and a stationary member having heel and instep embracing portions; means disposed on the plate in engagement with the movable member at its ends for drawing said ends rearwardly toward and into register with said stationary member and into engagement with a boot sole; means having portions filling the recesses and movable into alinement with the movable member for holding the latter in position to engage the sole of said boot; and means for holding a boot sole within said enclosure in pressure contact with the tread forming surfaces of the plate.

2. A device of the character described, comprising a heat conductive plate adapted to support a rubber boot or the like in a vulcanizing treatment and having heel, instep and sole tread forming surfaces on which a boot rests; tread outlining means on said plate, including a sole embracing member movably mounted on said plate with the ends thereof extending rearwardly adjacent the instep position, and a stationary member having heel and instep embracing portions; means including a cam rotatably mounted on said plate adjacent each end of said movable member and operatively engaging said member for simultaneously drawing said member rearwardly towards said stationary member and pushing the same laterally against a boot sole; and means for holding a boot sole within said enclosure in pressure contact with the tread forming surfaces of the plate.

3. In apparatus for resoling rubber boots and the like, a mold element comprising a heat conductive plate having heel, instep and sole tread forming surfaces on which a boot rests; a tread outlining member on said plate, including a flexible strip loosely supported on said plate and disposed in sole embracing relation to the boot with the ends thereof extending rearwardly adjacent the instep position, and a stiffening member secured to each end of said strip; a shoulder on said plate providing heel and instep outlining portions and formed integrally with the plate; and means including cams rotatably mounted on said plate adjacent the ends of said strip and in operative engagement with said stiffening members, for simultaneously drawing said strip rearwardly and pushing the same laterally into alinement with said shoulder and into engagement with a boot tread.

4. In apparatus for resoling rubber boots, a mold element comprising a heat conductive plate having heel, instep and sole tread forming surfaces on which a boot rests, said tread forming surfaces including a plurality of channels extending inwardly toward the center of said plate; a flexible strip loosely mounted on said plate and disposed in sole embracing relation to the boot with the ends thereof extending rearwardly adjacent the instep position; means on said plate providing heel and instep outlining portions; means engageable with the ends of said strip for drawing said strip rearwardly and simultaneously pushing the same laterally, said strip thereby being drawn into engagement with a boot tread and also into alinement with said heel and instep means; and plates adapted to fill said channels and adjustable independently of the adjustment of said strip, for closing said channels beneath said strip and preventing an outflow of rubber or the like therethrough.

5. In apparatus for resoling rubber boots and the like, a mold element comprising a heat conductive plate having heel, instep and sole tread forming surfaces upon which a boot rests; means on said plate providing heel and instep outlining portions; a tread outlining flexible strip loosely mounted on said plate and disposed in sole embracing relation to the boot with the ends thereof extending rearwardly at the instep position, stiffening members disposed alongside said strips adjacent the rear ends thereof, said members being provided with serrations on the sides thereof opposite said strip; and rotatable cams having interlocking serrations and disposed exteriorly of said members with the serrations of said cams engaging the serrations of said members, whereby rotation of said cams draws said members and said strip rearwardly to cause said strip to engage the sole of a boot and also moves said members and the end portions of said strip laterally inwardly toward the instep of said boot and into alinement with the instep portion of said heel and instep means.

JOHN W. LA FOLLETTE.

REFERENCES CITED

The following references are of record in the file of this patent:

UNITED STATES PATENTS

| Number | Name | Date |
| --- | --- | --- |
| 2,330,989 | Nevills | Oct. 5, 1943 |